United States Patent [19]

Shimizu et al.

[11] 4,221,661
[45] Sep. 9, 1980

[54] METHOD OF DEHYDRATING ORGANIC SLUDGE

[75] Inventors: Tohru Shimizu, Atsugi; Hideki Haji; Fujiaki Mochizuki, both of Yokohama, all of Japan

[73] Assignee: Kurita Water Industries Ltd., Osaka, Japan

[21] Appl. No.: 936,325

[22] Filed: Aug. 24, 1978

[30] Foreign Application Priority Data

Jun. 20, 1978 [JP] Japan ............................... 53/74564

[51] Int. Cl.³ ............................................. C02F 11/14
[52] U.S. Cl. ................................. 210/721; 210/51; 210/56; 210/63 Z; 210/71; 210/759
[58] Field of Search ..................... 210/4–7, 210/10, 12, 18, 42 R, 50, 51–54, 56, 63 R, 63 Z, 67, 71, 735

[56] References Cited

U.S. PATENT DOCUMENTS

| | | | |
|---|---|---|---|
| 2,131,711 | 9/1938 | Porteous | 210/56 |
| 3,183,186 | 5/1965 | Oster | 210/10 |
| 3,530,067 | 9/1970 | Friedman | 210/18 |
| 3,697,417 | 10/1972 | Teletzke et al. | 210/56 |

FOREIGN PATENT DOCUMENTS

| | | | |
|---|---|---|---|
| 2460286 | 7/1975 | Fed. Rep. of Germany | 210/10 |
| 2327965 | 6/1977 | France | 210/10 |

OTHER PUBLICATIONS

Babbitt et al., *Sewerage and Sewage Treatment*, 8th Ed., 1958, pp. 446–448.

*Primary Examiner*—Charles N. Hart
*Assistant Examiner*—Peter A. Hruskoci
*Attorney, Agent, or Firm*—Blanchard, Flynn, Thiel, Boutell & Tanis

[57] ABSTRACT

A method of dehydrating an organic sludge, which comprises adjusting the pH value of a sludge having a solids concentration in the range of from 0.5 to 8% by weight, to a pH of 5 or less, heating the thus adjusted sludge, mixing with the sludge an oxidizer capable of displaying oxidation ability within the acid region, and dewatering the sludge with a dehydrator.

5 Claims, 2 Drawing Figures

METHOD OF DEHYDRATING ORGANIC SLUDGE

BACKGROUND OF THE INVENTION (a) Field of the Invention

The present invention relates to an improvement on the method for dehydration treatment of sludges containing organic matters, such as raw sludge, digested sludge, surplus sludge, aggregated sludges and mixed sludge arising from sewage or industrial waste water treatment facilities.

(b) Description of the Prior Art

Heretofore, the aforementioned various sludges containing organic matters have been subjected to dehydration treatment by means of a centrifugal dehydrator, a vacuum dehydrator or a pressure dehydrator with adding thereto a dehydrating agent such as high molecular weight organic polymers, an iron salt or slaked lime. These methods of dehydration in the prior art, however, are attended with various troubles such that it is difficult to make the water content of the sludges, per se, to be less than 85% by weight, and when an iron salt or slaked lime is employed, the apparent water content of the cakes can be decreased to 85% by weight or less, but on the other hand the amount of the cake increases sharply. Meanwhile, in view of the necessity of preventing environmental pollution, the art of treating water and waste water has advanced year after year, and the rate of recovery of organic matters or suspended substances from water and waste water has been much improved. Consequently, the amount of the resulting sludges, particularly sludges which are hard to dehydrate, has increased year after year, posing a grave social and environmental problem.

Sludges, especially sludges which are hard to dehydrate, generally contain a lot of organic matters, and these organic matters are reported to be composed of high molecular proteins and polysaccharides. With attention being paid to the organic matters contained in these sludges, various attempts have been made to improve the dehydratability of the sludges, for instance, a method comprising lowering the pH value of a sludge slurry to the vicinity of the isoelectric point of the proteins, a method comprising pouring an oxidizer together with air or oxygen continuously into the sludge at a temperature of 80° C., a method comprising subjecting the sludge to heat treatment at a medium high temperature, say, 140° to 180° C., or a method comprising refrigerating the sludges so as to freeze the water in the surroundings as well as the inner part of the sludge and melting them thereafter, thereby performing dehydration.

SUMMARY OF THE INVENTION

The present inventors have made a series of studies and examinations with a view to finding ways and means of accomplishing dehydration of sludges more efficiently than the foregoing methods in the prior art. And, as a result, an efficient method of dehydrating sludges containing organic matters has been found.

In other words, the present invention provides a method of dehydrating a sludge containing organic matter, which comprises the steps of adjusting a pH value of the sludge to be 5 or less, the sludge having been adjusted beforehand to have a solids concentration in the range of from 0.5 to 8% by weight, heating the thus adjusted sludge, mixing an oxidizer capable of displaying oxidation ability within the acid region with the sludge, and feeding the thus processed sludge to a dehydrator for dehydration.

Further, the present invention provides a method of dehydrating sludge containing organic matter, which comprises the steps of adjusting the pH value of the sludge to be 5 or less, said sludge having been adjusted beforehand to have a solids concentration in the range of from 0.5 to 8% by weight, heating the thus adjusted sludge, mixing an oxidizer capable of displaying oxidation ability within the acid region with the sludge, cooling the resulting sludge thereafter, and feeding the thus processed sludge to a dehydrator for dehydration.

BRIEF DESCRIPTION OF THE DRAWING

Referring to the accompanying drawings.

DETAILED DESCRIPTION OF THE INVENTION

Figure 1:
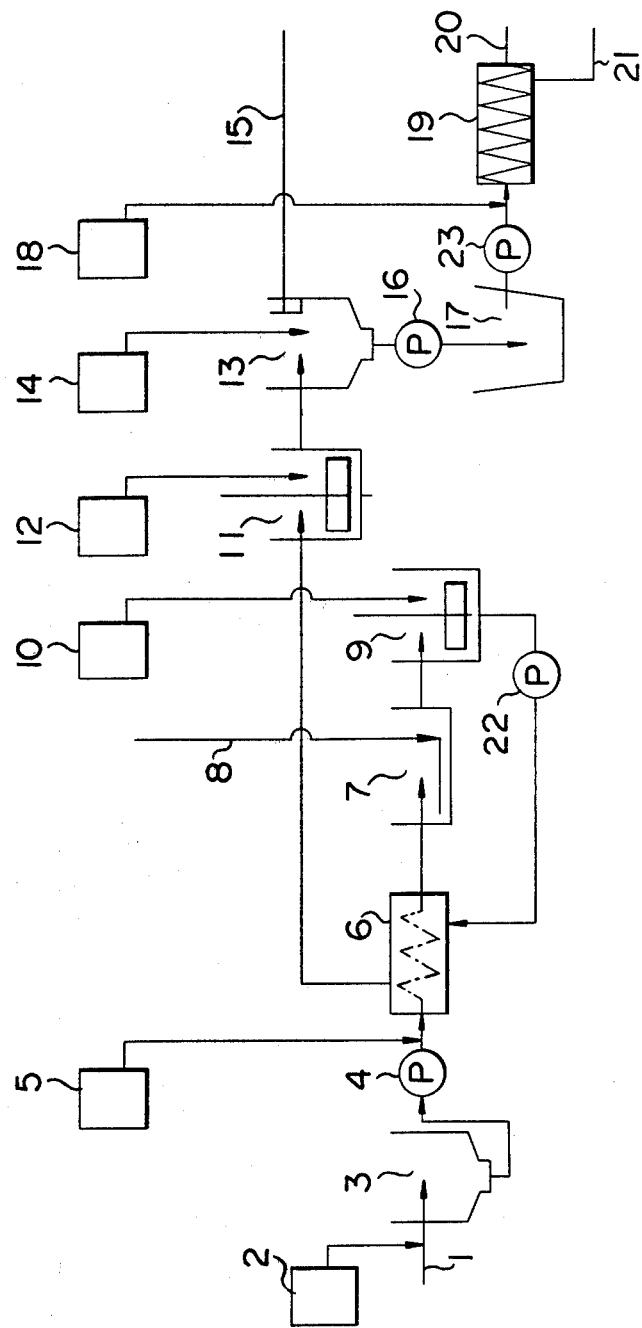
FIG. 1 is a flow-sheet illustration of an example of apparatuses useful in practicing the method of the present invention.

Particulars of the present invention will be given hereunder with reference to the aforementioned flow-sheet.

In the present invention, as the first step, to begin with, the sludge 1 to be subjected to the dehydration treatment and which has been sent from a biochemical treatment means, is adjusted by an appropriate sludge thickening means 3 to have a solids concentration in the range of from 0.5 to 8% by weight. This adjustment of the solids concentration can be performed by sedimentation concentration or centrifugal dehydration, and particularly it is preferable to adjust the solids concentration to be in the range of from 4 to 8% by weight. It can be performed by, for example, a centrifugal dehydrator with adding an inorganic coagulant 2 such as iron salt, etc.

By raising the solids concentration in the sludge as above, the volume of the sludge is markedly reduced, and the heat requirements for the succeeding heating step as mentioned later as well as the amount of chemicals can be reduced.

Next, the sludge is pumped by pump 4 to the second step, wherein the pH value of the sludge, whose solids concentration has been adjusted to be in the range of from 0.5 to 8% by weight in the preceding step, is adjusted to be 5 or less, preferably in the range of from 4 to 3. For the purpose of this adjustment of pH value, an acid, e.g., hydrochloric acid, sulfuric acid or the like, is usually employed and it is supplied from the acid source 5. Besides, if at least a part of ferric chloride, ferric sulfate, etc. to be employed in the succeeding third step is added at this step it will lower the pH value and reduce the amount of acid to be applied. Further, in the case where the pH value comes to be in the vicinity of neutrality, dehydration takes much time and the water content does not lower sufficiently. The sludge after having its pH value adjusted to be 5 or less is heated up to a temperature of 95° C. or less, preferably in the range of from 70° to 95° C., within a heating tank 7 into which steam is blown from a conduit 8, and thereafter the sludge is mixed with an oxidizer supplied from an oxidizer source 10 within a reaction tank 9. The heating can be performed by the use of an optional heating medium such as steam, etc. As the oxidizer, any substance will do as far as it is capable of displaying oxidation ability within the acid region; yet, hydrogen peroxide and persulfate are preferable from the viewpoint of economy as well as easy handling. Chlorine-type oxidizers are also effective, but there is a necessity for coping with diffusion of chlorine gas into the air under acid condition. The amount of the oxidizer to be applied is 100 ppm or more, preferably in the range of from 1,000 ppm to 2,000 ppm; in the case when it is less than 100 ppm, the sludge modification effect thereof is small, while an addition in excess of 2,000 ppm would not result in any further improvement of the effect. Moreover, the amount of the oxidizer to be applied suffices to be as described above regardless of the solids concentration contained in the sludge; for instance, even in the case of the sludges having a solids concentration in range of from 0.5 to 8% by weight, they can be treated as well. Since the oxidizer acts on the sludge rapidly, the time for mixing suffices to be short and is preferably in the range of from 10 to 60 minutes; when the time for mixing is prolonged, the water content of the sludge rather tends to deteriorate.

Among the above discussed conditions for treatment of the sludges, the adjustment of pH value, heating and the addition of the oxidizer may be performed in optional order, but in order to perform efficiently, it is preferable to follow the above described order. That is, when the adjustment of pH value is performed in the first place, the viscosity of the sludge is lowered, thereby facilitating stirring at the heating step and uniform conduction of heat, and the oxidizer is added next under such a condition it is diffused and mixed uniformly in the whole sludge, thereby facilitating reaction. On the contrary, when the oxidizer is first added, not only does the sludge become apt to foam and become inconvenient for handling, but also the oxidizer applied fails to be completely utilized, thereby developing a tendency to lower the reaction efficiency. When heating is performed beforehand, the sludge becomes viscous, whereby the modification of the sludge with the oxidizer is rendered insufficient and concentration or dehydration of the sludge tends to become difficult.

Through the treatment in the foregoing first and second steps, the sludge is modified, so that the original sludge that is hard to filter decreases in viscosity and change into a sludge which is easy to dehydrate. The thus modified sludge, before treatment in the third step, are preferably cooled by means of a cooler 6. As a method of cooling, any method can be adopted, but it is preferable to perform heat exchange between the sludge heated in the second step and the sludge which has subjected to a adjustment of pH value at the initial stage of the second step because not only the intended purpose can be easily accomplished thereby, but also there is no necessity for adding a cooling medium from outside and the amount of heat source for heating the sludge can be reduced that much. By means of the pump 22, the sludge is pumped from the reaction tank 9, through the heat exchanger 6 to the pH adjusting tank 11.

The reason why it is preferable to cool the sludge heated in the second step at this stage is that, in the case where the sludge in the heated condition is directly subjected to the adjustment of pH value in the third step, proteins, etc. contained in the sludges would hydrolyze, the concentration of suspended matters, COD and chromaticity of the supernatant water 15 and filtrate 21 arising from the thickening means 13 or dehydrator 19 would increase, thereby rendering it impossible to treat said water and filtrate satisfactorily when it is recycled to a biochemical treatment means. The temperature for cooling is set less than 70° C., preferably not more than 60° C., as described in the following examples.

Next, as the third step, the sludge treated in the second step is fed to a dehydrator 19 for dehydration. On this occasion, it is preferable that the pH value of the acidic sludge is adjusted to be over 5 and not more than 7 in a pH adjusting tank 11 by adding an alkali agent, e.g., caustic soda or slaked lime, from an alkali source 12. And it is further preferable that the acidic sludge whose pH has been adjusted be once concentrated within a thickener 13.

By virtue of thus adjusting the pH value, not only does the volume of the sludge to be treated per unit filter area of the dehydrator increase, but also the risk of corrosion due to acid within the dehydrator is alleviated compared to the case of directly feeding sludges having a pH value of 5 or less. When the pH value exceeds 7, the volume of the sludge to be treated with the dehydrator decreases again.

Besides, by virtue of concentrating the sludge, which has been subjected to adjustment of pH value, by means of the thickener 13, the load of the succeeding dehydration with the dehydrator 19 can be reduced and the amount of dehydration can be increased. On the occasion of effecting concentration within the thickening means 13, it is preferable to apply coagulant from a coagulant source 14 additionally because the time for concentration can be shortened and coagulated flocs can be packed thereby. As the coagulant for this purpose, various coagulants are applicable, yet a cationic high molecular coagulant is particularly desirable.

The sludge, which has been subjected to the adjustment of pH value and concentrated as mentioned above, are pumped by a pump 16 into a sludge pit 17 and thereafter and are pumped by a pump 23 to a dehydrator 19. As the dehydrator, a vacuum or pressure filter such as filter press, moving belt filter, rotary drum-type vacuum filter, sponge roll-type pressure dehydrator, etc. can be utilized. Especially, a filter press is preferable because it has such advantages that it can perform dehydration satisfactorily without requiring any dehydrating agent even when the solids concentration is low to some extent, and that the treating ability thereof is high.

Meanwhile, in the case where the dehydration treatment is performed by means of a dehydrator employing a filter cloth, like a vacuum filter or a pressure filter, it is desirable to add a dehydrating agent 18 from a source thereof to the sludge in order to improve the separation efficiency of the dehydrated cake from the cloth. This dehydrating agent can be either an inorganic dehydrating agent or an organic dehydrating agent as applied independently or jointly. As an applicable inorganic dehydrating agent, there can be cited ferric salts such as ferric chloride, ferric sulfate, etc., and as an applicable organic dehydrating agent, there can be cited cation modified polyacryl amide, cationic polyacrylic ester, etc. Referring to the appropriate dosage of the dehydrating agent, in the case of ferric salts it is in the range of from 1 to 15% by weight relative to the weight of dry solids contained in the sludge, while in the case of an organic dehydrating agent, it is 1% by weight or less relative to the weight of dry solids contained in the sludge. By virtue of the addition of such a dehydrating agent, the disposal amount of the sludge in the dehydration treatment increases sharply. The supernatant water 15 obtained from the thickening means and the filtrate 21 from a dehydrator are desirably returned to the biochemical treatment means to be treated further. As for the cake 20, it can be abandoned or transferred to final disposal, such as incineration, etc., according to the use. In this connection, the reference numerals 4, 16, 22 and 23 in the drawings denote pumps, respectively.

According to the present invention, as it is possible to modify the hydrated state of organic matters contained in a sludge by changing temperature and adding chemicals thereby improving the dehydrability of the sludge and controlling the generation of cake to be a minimum while recovering the cake in the state of a low water content, the final disposal of the sludges, i.e., abandonment, incineration or the like is much facilitated.

Hereunder will be given full particulars of the present invention by reference to examples embodying the invention.

In this context, the dehydration tests on sludges in these examples were conducted according to the nutsche test or leaf test method. In the nutsche test, a fixed quantity of sludge slurry after modification treatment by the method of the present invention or a reference sludge slurry was poured into a nutsche having a filter area of 9.6 cm$^2$, and such a slurry was subjected to suction from a lower part thereof at a vacuum pressure of 100 mmHg. As a filter cloth, Polyester #501B was employed, and the time taken until no more filtrate was obtained was measured, while the cakes obtained were immediately taken out, dried, and the water content thereof was sought. The leaf test was conducted in accordance with the sewerage test method (provided by the Japan Sewage Works Association).

EXAMPLE 1

Figure 2:
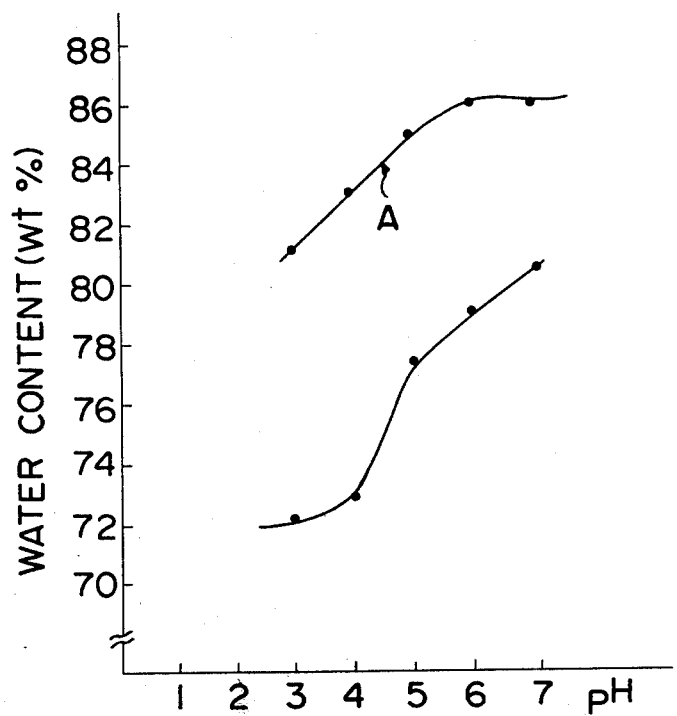
FIG. 2 is a graph of the experimental results of Example 1. To explain the principal items of apparatus which are arranged in a regular sequence for performing the process of the present invention, the reference numeral 3 in FIG. 1 denotes a sludge thickening means, 6 denotes a heat exchanger, 7 denotes a heating tank, 9 denotes a reaction tank, 11 denotes a pH value adjusting tank, 13 denotes a sludge thickening means, 17 denotes a sludge pit, and 19 denotes a dehydrator.

By adding sulfuric acid to various surplus sludges arising from a sewage treatment facility and having 1 wt.% concentration of solids, the pH value of the respective sludges was adjusted to be in the range of from 3 to 7. The respective slurries thus prepared were heated up to a temperature of 80° to 90° C., and upon adding thereto 1,000 ppm of hydrogen peroxide at a time, 30 minutes' stirring was conducted. After adjusting the sludge slurry modified as above to have a pH value of 6 with caustic soda, 0.5 wt.% of a cationic high molecular dehydrating agent (of polyacrylic ester type) and 5 wt.% of ferric chloride based on the weight of dry solids (ds) contained therein were added thereto, and the water content of the cakes was measured through the nutsche test. The result was as shown in FIG. 2. As is evident from FIG. 2, according to the present invention, all sludge slurries were lower in water content than the reference sludge slurry A (which was heated at a temperature of 80° to 90° C. for 30 minutes and contained no hydrogen peroxide) in any pH region. Particularly when the pH value was 5 or less, the water content lowered sharply compared with the lowering tendency of water content of the reference sludges, and in the vicinity of pH value 3 to 4, a conspicuous effect was obtained.

EXAMPLE 2

By adding sulfuric acid to surplus sludge arising from a sewage treatment facility and having 3 wt.% concentration of solids, the pH value of the sludge was adjusted to be 3. Thus prepared slurry was heated up to a temperature of 20° to 120° C., and upon adding 1,000 ppm of hydrogen peroxide at a time, 30 minutes' stirring was conducted. After adjusting the slurry modified as above to have a pH value of 6 to 7, a cationic high molecular dehydrating agent and ferric chloride were added thereto in amounts of 0.5 wt.% and 5 wt.%, respectively, based on the weight of dry solids contained therein as in Example 1, and the time required for filtration and the water content of the cakes were measured through the nutsche test. The result was as shown in Table-1. As is evident from this result, a satisfactory dehydrability can be expected when heating is conducted at a temperature of 70° to 120° C. in the presence of an oxidizing agent, and particularly when the temperature is in the range of from 80° to 95° C., there can be obtained a remarkable effect that the water content becomes 80% or less.

Table 1

| | Reaction temperature (°C.) | 20 | 60 | 70 | 80 | 90 | 95 | 120 |
|---|---|---|---|---|---|---|---|---|
| present invention | water content (wt.%) | 84.5 | 84.5 | 82 | 78 | 76 | 76 | 80 |
| | time for filtration (second) | 65 | 65 | 62 | 60 | 58 | 60 | 80 |
| Reference | water content (wt.%) | 86 | 86 | 85 | 84 | 83 | 83 | 85 |
| | time for filtration (second) | 100 | 95 | 70 | 65 | 65 | 65 | 80 |

(Remark) Reference: No hydrogen peroxide was added. Others were the same as in the example embodying the present invention.

EXAMPLE 3

Slurry obtained by adding sulfuric acid to mixed sludge arising from a sewage treatment facility and having 3 wt.% concentration of solids and adjusting the pH value thereof to be 4 was heated up to a temperature of 95° C. Immediately after the temperature of the slurry reached 95° C., 1,000 ppm of each of hydrogen peroxide, potassium persulfate and ozone as an oxidizing agent were added thereto at a time, and 30 minutes' stirring was conducted subsequent thereto. To the slurry mixed with these various oxidizing agents respectively was added caustic soda so as to neutralize it to have a pH value of 7, and was further added 0.5 wt.% of a high molecular dehydrating agent in the same way as in Example 1, and the time required for filtration of the slurry and the water content of the cakes were measured through the nutsche test. The result was as shown in Table-2. This result verifies that mixing any of the foregoing oxidizing agents improves the dehydratability of the sludges, and particularly in the case of applying hydrogen peroxide or potassium persulfate, the improving effect with respect to the time for filtration was remarkable.

Table 2

| An oxidizing agent | Hydrogen peroxide | Potassium persulfate | Ozone | Reference |
|---|---|---|---|---|
| water content (wt.%) | 74 | 76 | 75 | 84 |
| time for filtration (second) | 20 | 30 | 35 | 45 |

(Remark) Reference: No oxidizing agent was added; pH value = 3 (adjusted by the use of sulfuric acid); heating was conducted at 90° C. for 30 minutes.

EXAMPLE 4

By adding 10 wt.% of ferric chloride or 7 wt.% of ferric sulfate to a slurry of mixed sludge arising from a sewage treatment facility and having 4 wt.% concentration of solids, and thereafter adjusting the pH value to be 3.5 by adding sulfuric acid, a variety of slurries were prepared. The respective slurries were heated up to a temperature of 90° C., and thereafter 1,000 ppm of hydrogen peroxide were added thereto and 30 minutes' stirring was conducted. After neutralizing the thus modified slurry with caustic soda to have a pH value of 6 to 7, the water content of the cakes and the amount of the slurry treated (in terms of dry solids) were sought through the leaf test. The result was as shown in the column B of Table-3. In this context, shown in the column A of Table-3 is the result in the case where the treatment was conducted under the same conditions as in the present example save for omission of the use of hydrogen peroxide, and shown in the column C of Table-3 is the result in the case where the treatment was conducted under the same conditions as in the present example save for replacement of the ferric salt with ferrous sulfate.

Table 3

| | | | |
|---|---|---|---|
| A | ferric chloride 10 wt.% | water content (wt.%) | 88.5 |
| | | amount of sludges treated (Kg/m$^2$/hr) | 11.0 |
| | ferric chloride 10 wt.% | water content (wt.%) | 77 |
| | | amount of sludges treated (Kg/m$^2$/hr) | 12.2 |
| B | ferric sulfate 7 wt.% | water content (wt.%) | 77 |
| | | amount of sludges treated (Kg/m$^2$/hr) | 13.0 |
| C | ferrous sulfate 10 wt.% | water content (wt.%) | 78 |
| | | amount of sludges treated (Kg/m$^2$/hr) | 8.0 |

As is evident from the foregoing results, addition of iron salt in the modification process does not deteriorate the dehydrability improving effect; rather by virtue of addition of iron salt, the amount of sulfuric acid for use as a pH value adjusting agent can be reduced. Besides, taking account of the fact that the effect in terms of the water content of the cakes and the amount of sludge treated in the case of using ferrous sulfate in the present test (cf. the result shown in the column C of table-3) was inferior to that in the case of using ferric salt, it is obvious that the improvement of the dehydratability according to the present invention is not attributed to the Fenton's treatment to be performed on conditions of the presence of both ferrous salt and hydrogen peroxide. To speak of the type of iron salt, ferric salt was superior to ferrous salt in both the dehydration effect and the amount of the sludges treated. Ferric chloride and ferric sulfate displayed practically equal effect.

EXAMPLE 5

Surplus sludge arising from a sewage treatment facility was dehydrated with a screw decanter, as having 4 wt.% concentration of solids. Then, after adjusting the pH value to be 3.0, the sludge was heated up to a temperature of 90° C., 1,000 ppm of hydrogen peroxide were added to the thus heated sludge, and 30 minutes' stirring was conducted. Subsequently, thus treated sludge was subjected to the leaf test by adding 5 wt.% of ferric chloride and 0.5 wt.% of cationic high molecular coagulant based on the weight of dry solids contained therein with respect to (1) the case wherein the pH value of said sludges did not undergo any adjustment, (2) the case wherein the pH value of said sludge was adjusted to be 5.5 with caustic soda, and (3) the case wherein the pH value of said sludge was adjusted to be 7.5 with caustic soda. When the amount of sludge treated at the time when 76 wt.% of the water content of the cakes had been attained in this test was measured, it was 15.5 Kg-ds/m$^2$·hr, in the case of 1, but it increased to 18.0 Kg-ds/m$^2$·hr in the case of 2, while in the case of 3 it was as small as 13.5 Kg-ds/m$^2$·hr.

EXAMPLE 6

Mixed raw sludge obtained from a sewage treatment facility and treated in a thickener to have 4 wt.% concentration of solids was adjusted to have a pH value of 5 by adding sulfuric acid, and thereafter was heated at a temperature of 90° C. for 30 minutes by applying steam. Next, 1,000 ppm of hydrogen peroxide were added to this sludge, and after thorough stirring, the sludge was cooled down to a temperature of 30° to 80° C. Thus cooled sludge was then introduced into a thickener, and the resulting supernatant water was subjected to measurement of the concentration of suspended solids, CODcr, and chromaticity. Shown in the following Table-4 are average values of the results of the measurements.

Table 4

| Cooling temperature (°C.) | Concentration of suspended solids (ppm) | CODcr (ppm) | Chromaticity (degree) |
|---|---|---|---|
| 60≧ | 390 | 6,500 | 1,900 |
| 60<, 70> | 700 | 7,600 | 3,300 |
| 70≦ | 1,780 | 9,600 | 9,300 |

It is evident from the table, in the case where the cooling temperature is less than 70° C. the quality of the supernatant water is improved compared with that in the case where the cooling temperature exceeds 70° C., and particularly when said temperature is 60° C. or less, the quality of said water becomes very satisfactory.

What is claimed is:

1. A method for dehydrating sewage sludge, which consists essentially of the steps of: adding to and mixing with sewage sludge having a solids content of from 0.5 to 8% by weight, an acid selected from the group consisting of hydrochloric acid and sulfuric acid to adjust the pH of said sewage sludge to a pH of from 3 to 4; then injecting steam into said sewage sludge to raise the temperature thereof to from 70° to 95° C.; then adding to said heated sewage sludge from 1,000 ppm to 2,000 ppm of oxidizer selected from the group consisting of hydrogen peroxide, potassium persulfate and ozone, and mixing said oxidizer with said sewage sludge for from 10 to 60 minutes to transform said sewage sludge to a modified sludge which is easy to dehydrate; then adding an alkali selected from the group consisting of slaked lime and caustic soda to said modified sludge to adjust the pH of said modified sludge to a pH of from 5 to 7; then adding coagulant to said modified sludge to coagulate solids therein; and then filtering said modified sludge to remove water therefrom.

2. A method according to claim 1 in which in said step of adding acid to said sewage sludge, there is additionally added a material selected from the group consisting of ferric chloride and ferric sulfate.

3. A method for dehydrating sewage sludge, which consists essentially of the steps of: adding to and mixing with sewage sludge having a solids content of from 0.5 to 8% by weight, an acid selected from the group consisting of hydrochloric acid and sulfuric acid to adjust the pH of said sewage sludge to a pH of from 3 to 4; then injecting steam into said sewage sludge to raise the temperature thereof to from 70° to 95° C.; then adding to said heated sewage sludge from 1,000 ppm to 2,000 ppm of oxidizer selected from the group consisting of hydrogen peroxide, potassium persulfate and ozone, and mixing said oxidizer with said sewage sludge for from 10 to 60 minutes to transform said sewage sludge to a modified sludge which is easy to dehydrate; then cooling said modified sludge to a temperature of 70° C. or less; then adding an alkali selected from the group consisting of slaked lime and caustic soda to said modified sludge to adjust the pH of said modified sludge to a pH of from 5 to 7; then adding coagulant to said modified sludge to coagulate solids therein; and then filtering said modified sludge to remove water therefrom.

4. A method according to claim 3 in which in said step of adding acid to said sewage sludge, there is additionally added a material selected from the group consisting of ferric chloride and ferric sulfate.

5. A method according to claim 4 in which said modified sludge is cooled to a temperature of 70° C. or less by flowing said modified sludge in indirect heat exchange relation with said sewage sludge after said sewage sludge has been adjusted to a pH of 3 to 4 and before said sewage sludge is heated to from 70° to 95° C.

* * * * *